(12) United States Patent
Ukani et al.

(10) Patent No.: US 6,744,586 B2
(45) Date of Patent: Jun. 1, 2004

(54) METHOD AND APPARATUS FOR MONITORING TEMPERATURE

(75) Inventors: Anish Ukani, Oklahoma City, OK (US); Raymond Dean Nicholson, Norman, OK (US); Paul Burnett, Oklahoma City, OK (US); Ronald L. Delamarter, Oklahoma City, OK (US); Robert Matousek, Oklahoma City, OK (US); Kent Dillin, Yukon, OK (US)

(73) Assignee: Seagate Technology LLC, Scott Valley, CA (US)

(*) Notice: Subject to any disclaimer, the term of this patent is extended or adjusted under 35 U.S.C. 154(b) by 223 days.

(21) Appl. No.: 09/753,791

(22) Filed: Jan. 3, 2001

(65) Prior Publication Data

US 2001/0030825 A1 Oct. 18, 2001

Related U.S. Application Data

(60) Provisional application No. 60/174,197, filed on Jan. 3, 2000.

(51) Int. Cl.$^7$ .............................................. G11B 15/18
(52) U.S. Cl. ......................................................... 360/69
(58) Field of Search ................................ 360/69, 77.02, 360/97.02; 369/116; 327/512, 513

(56) References Cited

U.S. PATENT DOCUMENTS

| 3,753,254 A | * | 8/1973 | Ruble et al. ............ 360/77.02 |
| 3,940,679 A | | 2/1976 | Brandwein et al. |
| 4,721,894 A | | 1/1988 | Graber |
| 5,128,813 A | * | 7/1992 | Lee ........................ 360/78.07 |
| RE35,302 E | | 7/1996 | Hoshimi et al. |
| 5,566,077 A | | 10/1996 | Kulakowski et al. |
| 5,760,563 A | | 6/1998 | Bennett et al. |
| 5,877,911 A | | 3/1999 | Klaassen et al. |
| 5,986,839 A | | 11/1999 | Klaassen et al. |
| 6,078,455 A | | 6/2000 | Enarson et al. |
| 6,088,662 A | | 7/2000 | Flinsbaugh et al. |
| 6,144,246 A | | 11/2000 | Wachter |
| 6,154,017 A | | 11/2000 | Contreras |
| 6,157,897 A | | 12/2000 | Yoshikawa |
| 6,160,383 A | | 12/2000 | Carkner |
| 6,166,356 A | | 12/2000 | Carlson |
| 6,266,203 B1 | * | 7/2001 | Street et al. ................. 360/69 |

\* cited by examiner

Primary Examiner—David Hudspeth
Assistant Examiner—K. Wong
(74) Attorney, Agent, or Firm—David K. Lucente; Derek J. Berger

(57) ABSTRACT

A temperature monitoring method and apparatus is provided in which temperature values are used to optimize temperature-dependent disc drive parameters.

The present invention also can be implemented as a computer-readable program storage device which tangibly embodies a program of instructions executable by a computer system to perform a temperature monitoring method.

14 Claims, 2 Drawing Sheets

METHOD AND APPARATUS FOR MONITORING TEMPERATURE

CROSS REFERENCE TO RELATED APPLICATIONS

This application claims the benefit of U.S. Provisional Application No. 60/174,197, filed Jan. 3, 2000.

FIELD OF THE INVENTION

The present invention relates generally to the field of disc drive storage devices. More particularly, the present invention relates to the monitoring of the temperature of the disc drive.

BACKGROUND OF THE INVENTION

Hard disc drives enable users of computer systems to store and retrieve vast amounts of data in a fast and efficient manner. In a typical disc drive, the data are magnetically stored on one or more discs which are rotated at a constant high speed and accessed by a rotary actuator assembly having a plurality of read/write heads that fly adjacent the surfaces of the discs.

The position of the heads is controlled by a closed loop, digital servo circuit. A preamp and driver circuit generates write currents that are used by the head to magnetize the disc during a write operation and amplifies read signals detected by the head during a read operation. A read/write channel and interface circuit is operably connected to the preamp and driver circuit to transfer the data between the discs and a host computer in which the disc drive is mounted.

Disc drive manufacturers typically produce a large number of nominally identical drives which are individually optimized during the manufacturing process through the setting of parameters that affect the operation of various disc drive circuits, such as the preamp and driver circuit, the servo circuit and the read/write channel. Such parameters are well known and typically include write current, write precompensation, servo gain, data and servo level detection thresholds, transversal equalizer tap weights, adaptive filtering parameters and, in disc drives employing magneto-resistive (MR) heads, read bias current. Such parameters are used to enable the disc drive to accommodate changes in data transfer rates that occur with respect to the radii on the discs at which the data are stored, noise levels, electrical and mechanical offsets and the like, all of which generally affect the operation of the drive.

Accordingly, the parameters are often set to an initial value during disc drive operation and then optimized against predefined acceptance criteria (for example, measured read error rate). Disc drives are often further provided with the capability of continually monitoring drive performance and adjusting certain parameters adaptively during operation to maintain optimum levels of performance.

One of the most significant variables affecting disc drive performance is temperature. Disc drives are complex electromechanical devices which include motors to rotate the discs and the actuator assembly. Although such motors are designed to operate efficiently, heat will nevertheless be generated as the disc drive operates over an extended period of time, which can substantially increase the operating temperature of the drive. Disc drives further include one or more processors and associated integrated circuitry having performance characteristics which are also affected by changes in temperature.

Attempts have been made in the prior art to monitor for variations in temperature in magnetic recording devices such as disc drives. For example, U.S. Pat. No. 6,088,662 entitled THERMOELECTRIC TEMPERATURE SENSING SYSTEM IN A COMPUTER HARD DISC DRIVE issued Jul. 11, 2000 to Flinsbaugh et al. describes a system that monitors the temperature using a temperature sensor mounted on an external circuit board and attached to the disc drive circuit board via wires.

While operable, the aforementioned and other prior art references are generally limited to the use of temperature sensors mounted on an external printed circuit board. This approach leads to a substantial discrepancy in the measured temperature compared to the actual temperature of the disc drive. Moreover, such approaches as found in the prior art typically attain temperature measurements through the implementation of additional sensors and circuitry, which generally increases the cost and complexity of the drive.

Thus, there is a continual need for improvements in the art whereby accuracy of disc drive temperature variations is needed for optimization of temperature-dependent disc drive parameters.

The present invention provides a solution to this and other problems, and offers other advantages over the prior art.

SUMMARY OF THE INVENTION

The present invention provides a method and apparatus for monitoring the temperature of a disc drive.

In accordance with one embodiment of the invention, a temperature monitoring method is provided in which the temperature value is retrieved from an internal temperature sensor. The temperature value may be used to optimnize temperature-dependent disc drive parameters.

The present invention also can be implemented as a computer-readable program storage device which tangibly embodies a program of instructions executable by a computer system to perform a temperature monitoring method.

These and various other features as well as advantages which characterize the present invention will be apparent upon reading of the following detailed description and review of the associated drawings.

DETAILED DESCRIPTION

Figure 1:
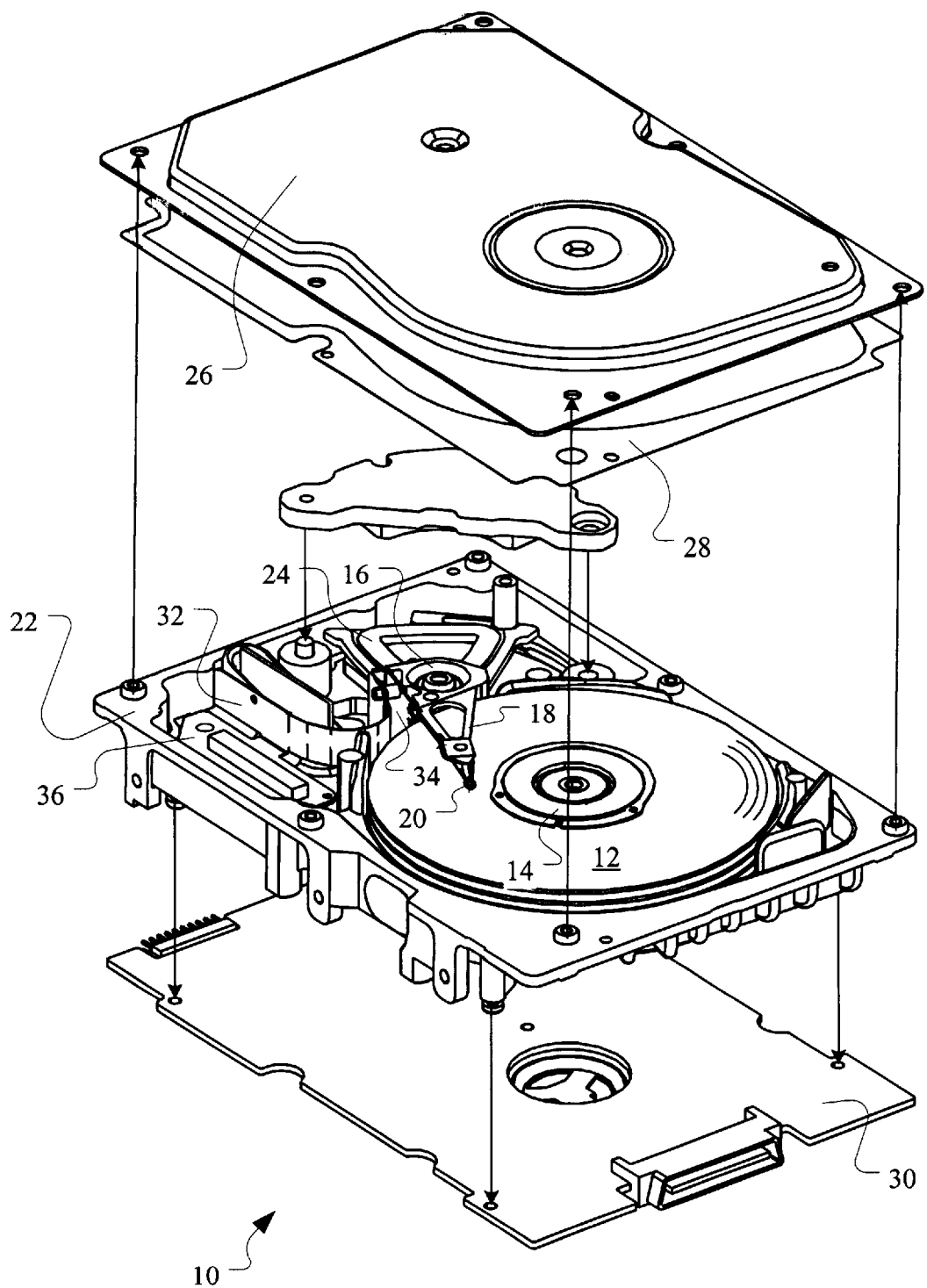
FIG. 1 is a drawing of a disc drive.

A disc drive 10 as shown in FIG. 1, consists of a cover 26, a gasket 28, a base deck 22, and a printed circuit board assembly (PCBA) 30 mounted to the base deck. The cover 26, gasket 28, and base deck 22 form a head disk assembly (HDA). The basic parts in a HDA include a voice coil 24, a number of discs 12 mounted on a spindle motor 14. An actuator 16 typically extends into a series of actuator arms 18, each of which holds out at least one head 20 such that each head reads from or writes to one surface of the discs.

A flex assembly 32 provides the requisite electrical connection paths for the actuator 16 while allowing pivotal movement of the actuator 16 during operation. The flex assembly 32 includes a printed circuit board 34 to which head wires (not shown) are connected, the head wires being routed along the actuator arms 18 to the heads 20. The printed circuit board 34 typically includes circuitry for controlling the write currents applied to the heads 20 during a write operation and for amplifying read signals generated by the heads 20 during a read operation. The flex assembly terminates at a flex bracket 36 for communication through the bottom of the HDA 22 to a disc drive printed circuit board assembly 30 mounted to the bottom side of the HDA 22. The PCBA 30 typically includes a temperature sensor (not shown) for monitoring the temperature of the HDA 22.

Figure 2:
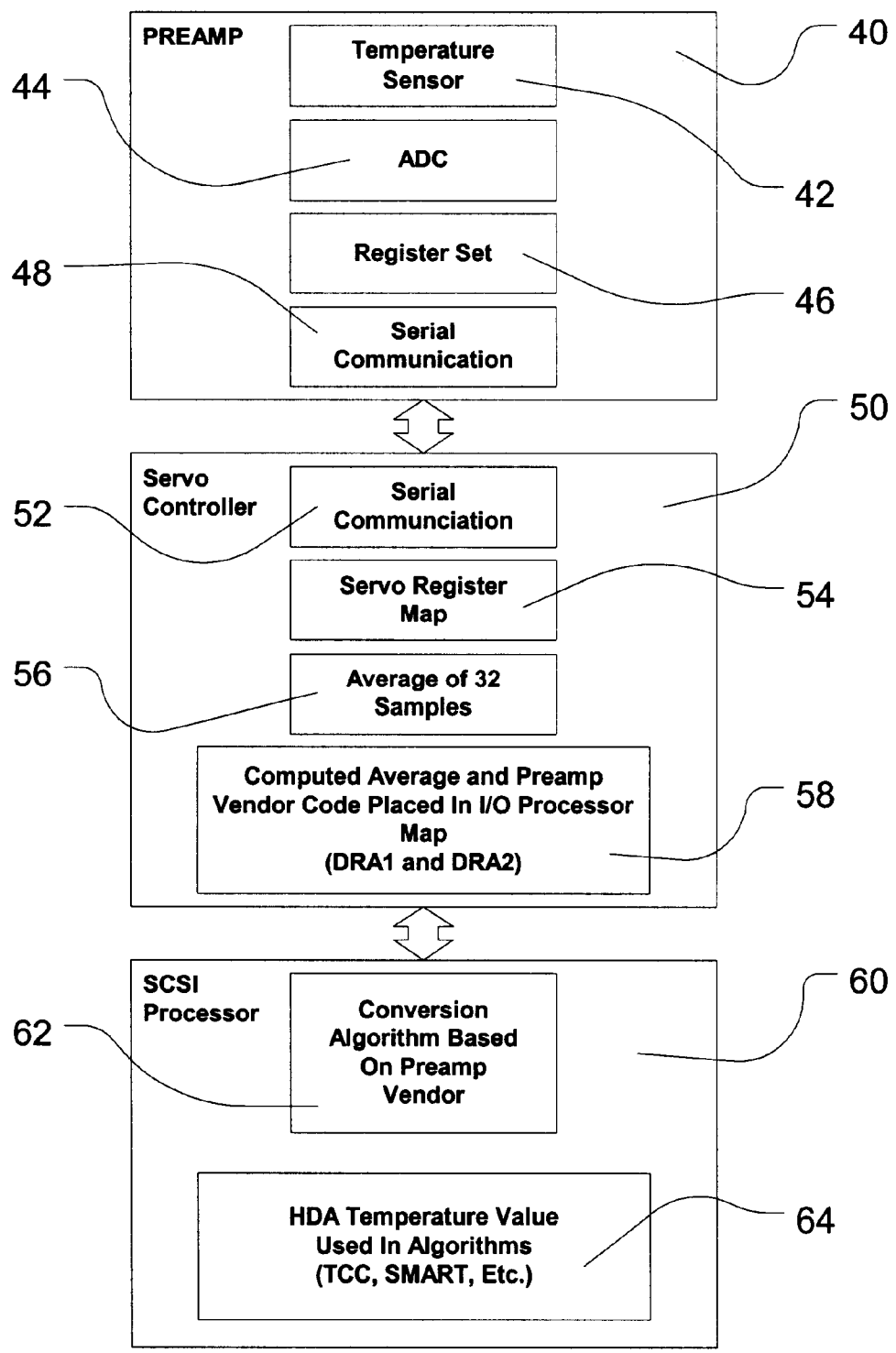
FIG. 2 shows a flowchart of a process according to a preferred embodiment of the present invention.

The present invention can be described in reference to FIG. 2 which is a block diagram of the preferred embodiment. When temperature is requested by the Small Computer System Interface (SCSI) processor 60, the servo controller 50 processes the request in the servo code (not shown) which will send command 487A out on the pre-amplifier serial bus 48. The value of 487A writes a 7A to register 9 (not shown), resulting in a launch of the temperature digitization, setting the pre-amplifier 40 in active mode, and setting the serial port 48 up for 5-volt communication. The pre-amplifier 40 has an internal temperature sensor 42 which provides an analog temperature measurement to the analog to digital converter (ADC) 44. The ADC 44 then stores the digital temperature value in the register set 46.

When a temperature sense command (2Fh) is received, the servo code (not shown) in the servo controller 50 will begin taking 32 samples from the pre-amplifier 40. After a set code delay of 229.5 µseconds, a command 41 is issued over the serial bus 48, which is a request to read register 8 (not shown). The value in register 8 is immediately returned to the servo controller 50 following the request. This value is decoded using Temp=126C−2C* (1*Bit0+2*Bit1+4*Bit2+8*Bit3+16*Bit4+32*Bit5). Since the most common error encountered in the test data on the Philips 5366 pre-amplifier was a register value of 00h, samples having this value will be immediately thrown out. For each sample in error, an additional sample will be taken. In any case, if the amount of samples exceeds sixty-four before getting thirty-two good values, an error code of FFFFh will be returned to the SCSI processor. As soon as thirty-two good samples are gathered, the values are averaged by right-shifting the sum of the values by 5 bits, which divides the sum by thirty-two. This value will be returned to the SCSI processor via the Diagnostic Response Array register 1 (DRA1) 58. The pre-amplifier revision code is returned via register 2 to insure the proper equation is used to convert the raw data in the SCSI processor. Following the register read, command 6A48 is sent out on the preamp serial bus. This command writes a value of 6A to register 9, turning off the digitization bit.

If the temperature sense command fails in the servo controller 50, a value of FFFFh will be returned to the SCSI processor. The SCSI processor will retry the command once if this error code is received. If this also fails, the Temperature Controlled Configuration (TCC) set will remain in the current set until a valid temperature is received or the unit is power-cycled, at which time, the TCC set would be nominal. If the command fails to return command complete, the SCSI processor will fail communication with the servo code in the servo controller.

In order for the SCSI processor to determine the correct equation to use, the pre-amplifier revision code will be placed in Diagnostic Response Array register 2 (DRA2) 58.

The computed average and pre-amplifier vendor code are then retrieved from DRAL and DRA2 58 by the SCSI processor 60. The temperature conversion equation is different for each type of pre-amplifier. The computed average is then converted based on the pre-amplifier vendor code and used in algorithms 64 which are HDA temperature dependent, such as the Temperature Controlled Configuration (TCC) sets and the System Monitoring and Reporting (SMART) systems.

One of the advantages of monitoring the temperature using a sensor internal to the HDA is to obtain a temperature that more closely reflects the actual temperature of the heads 20. The physical changes which occur in the heads over temperature variants are the reason why we use Temperature Controlled Configuration (TCC) sets.

Another one of the advantages of monitoring the temperature using a sensor located inside the HDA over other types of designs is the ability to achieve a higher accuracy of +/−3 degrees Celsius. When the sensor was on the PCBA 26, the board temperature could vary from the actual HDA temperature by as much as 10 degrees Celsius because of air temperature. Another advantage to the present invention is that the use of the temperature sensor embedded in the pre-amplifier reduces the complexity and number of parts on the PCBA. This reduction in complexity leads to a lower cost to produce such a disc drive.

A second contemplated embodiment is a temperature monitoring method where the temperature sensor (not shown) is a discrete entity mounted on an internal piece of the HDA 22, such as the actuator arm 18.

In another embodiment, one temperature sensor (not shown) could be located inside the HDA and a second temperature sensor (not shown) could be mounted on an external printed circuit board, such as the PC A30.

The number of temperature values used in the average temperature calculation is chosen from the group consisting of 32, 64, a range between 1 and 32, a range between 32 and 64, and a range between 64 and 256.

It is to be understood that even though numerous characteristic and advantages of various embodiments of the present invention ha e been set forth in the foregoing description, together with details of the structure and function of various embodiments of the invention, this disclosure is illustrative only, and changes may be made in detail, especially n matters of structure and arrangement of parts within the principles of the resent invention to the full extent indicated by the broad general meaning of the terms in which the appended claims are expressed. For example, the particular elements may vary depending on the particular application for the temperature monitoring method or apparatus while maintaining substantially the same functionality without departing from the scope and spirit of the present invention. In addition, although the preferred embodiment described herein is directed to a method for monitoring temperature of a disc drive, it will be appreciated by those skilled in the art that the teachings of the present invention can be applied to other systems, like computer peripherals and compact disc players, without departing from the scope and spin of the present invention.

What is claimed is:

1. A method for monitoring internal temperature of a head disc assembly in a disc drive, comprising steps of:
   (a) querying a temperature sensor located inside the head disc assembly to obtain temperature values;
   (b) conveying the temperature values over a communication line to a controller; and
   (c) calculating an average temperature from a subset of temperature values derived from the temperature values received by the controller.

2. The method of claim 1, further comprising the step of:
   (d) transmitting the average temperature to a processor.

3. The method of claim 2, wherein step (c) further comprises discarding irregularities in the temperature values prior to the calculation of the average temperature.

4. The method of claim 2, wherein the number of temperature values used in the average temperature calculation is chosen from the group consisting of 32, 64, a range between 1 and 32, a range between 32 and 64, and a range between 64 and 256.

5. The method of claim 1, wherein step (c) further comprises discarding irregularities in the temperature values prior to the calculation of the average temperature.

6. The method of claim 1, wherein the processor optimizes temperature-dependent disc drive parameters.

7. The method of claim 1, wherein the temperature sensor is embedded in an integrated circuit.

8. The method of claim 1, wherein the temperature sensor is discrete component.

9. The method of claim 1, wherein the number of temperature values used in the average temperature calculation is chosen from the group consisting of 32, 64, a range between 1 and 32, a range between 32 and 64, and a range between 64 and 256.

10. A method for monitoring internal temperature of an apparatus comprising steps of:

(a) providing a temperature sensor located inside the apparatus to obtain temperature values; and (b) calculating an average temperature from the temperature values.

11. An apparatus comprising a temperature sensor located inside the apparatus to obtain temperature values, wherein the apparatus is configured to calculate an average temperature from the temperature values.

12. The apparatus of claim 11, wherein the temperature sensor is embedded in an integrated circuit.

13. The apparatus of claim 11, wherein the temperature sensor is a discrete component.

14. The apparatus of claim 11, wherein the apparatus is a disc drive and further comprising a second temperature sensor located external to a head disc assembly which provides an indication of the external operational temperature of the disc drive.

* * * * *